(12) United States Patent
Mays et al.

(10) Patent No.: US 12,469,050 B2
(45) Date of Patent: Nov. 11, 2025

(54) MULTIPLE PLAYBACK LOCAL AD ROTATION

(71) Applicant: Comcast Cable Communications, LLC, Philadelphia, PA (US)

(72) Inventors: David Mays, Palmyra, NJ (US); Jason Press, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/985,423

(22) Filed: Nov. 11, 2022

(65) Prior Publication Data

US 2023/0252522 A1 Aug. 10, 2023

Related U.S. Application Data

(63) Continuation of application No. 16/549,436, filed on Aug. 23, 2019, now Pat. No. 11,532,016, which is a continuation of application No. 14/295,843, filed on Jun. 4, 2014, now Pat. No. 10,438,241.

(51) Int. Cl.
  G06Q 30/00 (2023.01)
  G06Q 30/0241 (2023.01)
  G06Q 30/0251 (2023.01)

(52) U.S. Cl.
  CPC ..... *G06Q 30/0264* (2013.01); *G06Q 30/0241* (2013.01); *G06Q 30/0269* (2013.01)

(58) Field of Classification Search
  None
  See application file for complete search history.

(56) References Cited

U.S. PATENT DOCUMENTS

| | | |
|---|---|---|
| 5,594,790 A | 1/1997 | Curreri et al. |
| 6,182,050 B1 | 1/2001 | Ballard |
| 8,417,569 B2 | 4/2013 | Gross |
| 2002/0083439 A1 | 6/2002 | Eldering |
| 2003/0013483 A1 | 1/2003 | Ausems et al. |
| 2004/0260874 A1 | 12/2004 | Mori et al. |
| 2006/0080171 A1 | 4/2006 | Jardins et al. |
| 2006/0271425 A1 | 11/2006 | Goodman et al. |
| 2006/0287915 A1 | 12/2006 | Boulet et al. |
| 2007/0022442 A1* | 1/2007 | Gil ............ H04M 1/72445 725/62 |

(Continued)

OTHER PUBLICATIONS

Local Web advertisement through dynamic active proxy, Jing Deng; Chi-Hung Chi. 2000 IEEE International Conference on Multimedia and Expo. ICME2000. Proceedings. Latest Advances in the Fast Changing World of Multimedia (Cat. No. 00TH8532): 1183-6 vol. 2;3 vol. xxxv+17778. IEEE. (2000). (Year: 2000).*

(Continued)

*Primary Examiner* — Matthew T Sittner
(74) *Attorney, Agent, or Firm* — Banner & Witcoff, Ltd.

(57) ABSTRACT

According to some aspects, disclosed methods and systems may include storing, in a local storage of a device, a plurality of advertisements; and outputting for display first content comprising a first portion of a first set of advertisements associated with a first campaign period. The disclosed methods and system may also include, in response to an expiration of the first campaign period, outputting for display second content comprising a second portion of the first set of advertisements based on a first set of one or more advertising rules.

37 Claims, 5 Drawing Sheets

(56) References Cited

U.S. PATENT DOCUMENTS

| | | |
|---|---|---|
| 2007/0100688 A1 | 5/2007 | Book |
| 2007/0150347 A1 | 6/2007 | Bhamidipati et al. |
| 2007/0150348 A1 | 6/2007 | Hussain et al. |
| 2007/0162328 A1 | 7/2007 | Reich |
| 2007/0192369 A1 | 8/2007 | Gross |
| 2007/0233857 A1 | 10/2007 | Cheng et al. |
| 2008/0109300 A1 | 5/2008 | Bason |
| 2008/0215416 A1 | 9/2008 | Ismalon |
| 2008/0271070 A1 | 10/2008 | Kanojia et al. |
| 2008/0275753 A1* | 11/2008 | Protheroe ........... G06Q 30/0275 705/14.69 |
| 2008/0281699 A1 | 11/2008 | Whitehead |
| 2009/0099911 A1 | 4/2009 | Ota |
| 2009/0112724 A1 | 4/2009 | Joo |
| 2009/0144129 A1 | 6/2009 | Grouf et al. |
| 2009/0144155 A1 | 6/2009 | Lora et al. |
| 2009/0328095 A1 | 12/2009 | Vinokurov et al. |
| 2010/0306225 A1 | 12/2010 | Mawani et al. |
| 2011/0015989 A1 | 1/2011 | Tidwell et al. |
| 2011/0161161 A1 | 6/2011 | Juda et al. |
| 2011/0231243 A1* | 9/2011 | Bhatia ................. G06Q 30/0255 705/14.43 |
| 2011/0264536 A1 | 10/2011 | Chodroff et al. |
| 2012/0016742 A1 | 1/2012 | Jiang |
| 2012/0054022 A1 | 3/2012 | Kosashvili |
| 2012/0158471 A1 | 6/2012 | Jain et al. |
| 2012/0158502 A1 | 6/2012 | Chung et al. |
| 2012/0158519 A1* | 6/2012 | Edwards ............ G06Q 30/0272 705/14.68 |
| 2012/0198200 A1 | 8/2012 | Li et al. |
| 2012/0221407 A1 | 8/2012 | Erasmus et al. |
| 2012/0246298 A1 | 9/2012 | McGowan |
| 2013/0006754 A1 | 1/2013 | Horvitz et al. |
| 2013/0117134 A1 | 5/2013 | Burnette et al. |
| 2013/0254022 A1 | 9/2013 | Rubrecht |
| 2014/0002736 A1 | 1/2014 | Kaushal et al. |
| 2014/0081767 A1 | 3/2014 | Zhang |
| 2014/0082660 A1 | 3/2014 | Zhang et al. |
| 2014/0143043 A1 | 5/2014 | Wickramasuriya et al. |
| 2014/0143803 A1 | 5/2014 | Narsimhan et al. |
| 2014/0149221 A1 | 5/2014 | Rycyna, III |
| 2014/0181694 A1 | 6/2014 | Barman |
| 2014/0211699 A1 | 7/2014 | Zhou et al. |
| 2014/0355955 A1* | 12/2014 | Berger ............... G06Q 30/0267 386/248 |
| 2014/0365675 A1 | 12/2014 | Bhardwaj et al. |
| 2015/0025962 A1 | 1/2015 | Becket et al. |
| 2015/0078538 A1 | 3/2015 | Jain |
| 2015/0348093 A1 | 12/2015 | Jiang et al. |
| 2015/0356612 A1 | 12/2015 | Mays et al. |

OTHER PUBLICATIONS

Toward an integrated framework for automated development and optimization of online advertising campaigns, Vazirgiannis, Michalis. Intelligent Data Analysis 18.6: 1199-1227. IOS Press, Nieuwe Hemweg 6B Amsterdam 1013 BG Netherlands. (2014). (Year: 2014).*
New services for iTVP content providers to manage live and on-demand content streaming, Czyrnek, Miroslaw; Kusmierek, Ewa; Mazurek, Cezary; Stroinski, Maciej. 2008 International Conference on Automated Solutions for Cross Media Content and Multi-Channel Distribution: 180-6. IEEE. (2008). (Year: 2008).*
Advertising Insertion in Sports Webcasts, Kongwah Wan, Kongwah Wan; Xin Yan, Xin Yan. IEEE Multimedia 14.2: 78-82. New York: The Institute of Electrical and Electronics Engineers, Inc. (IEEE). (2007). (Year: 2007).*
Extended European Search Report—EP Appl. 15170631.4—dated Oct. 8, 2015.
Aug. 1, 2018—European Office Action—EP 15170361.4.
Dec. 17, 2019—European Decision to Refuse—EP 15170631.4.
IP.com NPL Search History (Year:2021).
Jun. 18, 2021—Canadian Office Action—CA 2,893,759.
Aug. 4, 2022—CA Office Action—CA App. No. 2,893,759.

* cited by examiner

Fig. 5

MULTIPLE PLAYBACK LOCAL AD ROTATION

CROSS-REFERENCE TO RELATED APPLICATIONS

This application is a continuation of and claims priority to U.S. patent application Ser. No. 16/549,436, filed Aug. 23, 2019, which is a continuation of U.S. patent application Ser. No. 14/295,843, filed Jun. 4, 2014 (now U.S. Pat. No. 10,438,241), each of which is hereby incorporated by reference in its entirety.

BACKGROUND

Content providers have long sought to determine how to maximize revenue derived from advertisements, while minimizing costs associated with bandwidth and network usage. There is an ever-present need to maximize the amount of advertisements shown to a content user, while minimizing the use of network resources.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

One or more aspects of the disclosure provide for a method that may include storing, in a local storage of a device, a plurality of advertisements; and outputting for display first content comprising a first portion of a first set of advertisements associated with a first campaign period. The method may also include, in response to an expiration of the first campaign period, outputting for display second content comprising a second portion of the first set of advertisements based on a first set of one or more advertising rules.

One or more aspects of the disclosure provide for a method that may include receiving, by a device via a network, content, a set of one or more advertising rules, and advertisements associated with the content and the set of one or more advertising rules; and disconnecting, by the device, from the network. The method may also include in response to accessing the content for a first time while disconnected from the network, accessing a first portion of the advertisements based on the set of one or more advertising rules; and in response to accessing the content subsequent to the first time while disconnected from the network, accessing a second portion of the advertisements based on the set of one or more advertising rules.

One or more aspects of the disclosure provide for a method that may include storing, in a local storage of a device while the device is in an online state, a plurality of advertisements. The method may also include, in response to outputting content during a first campaign period while the device is in an offline state, outputting for display a first portion of a set of advertisements associated with the first campaign period stored on the device; and in response to outputting content during a second campaign period while the device is in an offline state, outputting for display a second portion of the set of advertisements associated with the second campaign period stored on the device.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 5 illustrates a schematic chart showing how advertisements may be inserted into other content, in accordance with one or more features described herein.

DETAILED DESCRIPTION

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
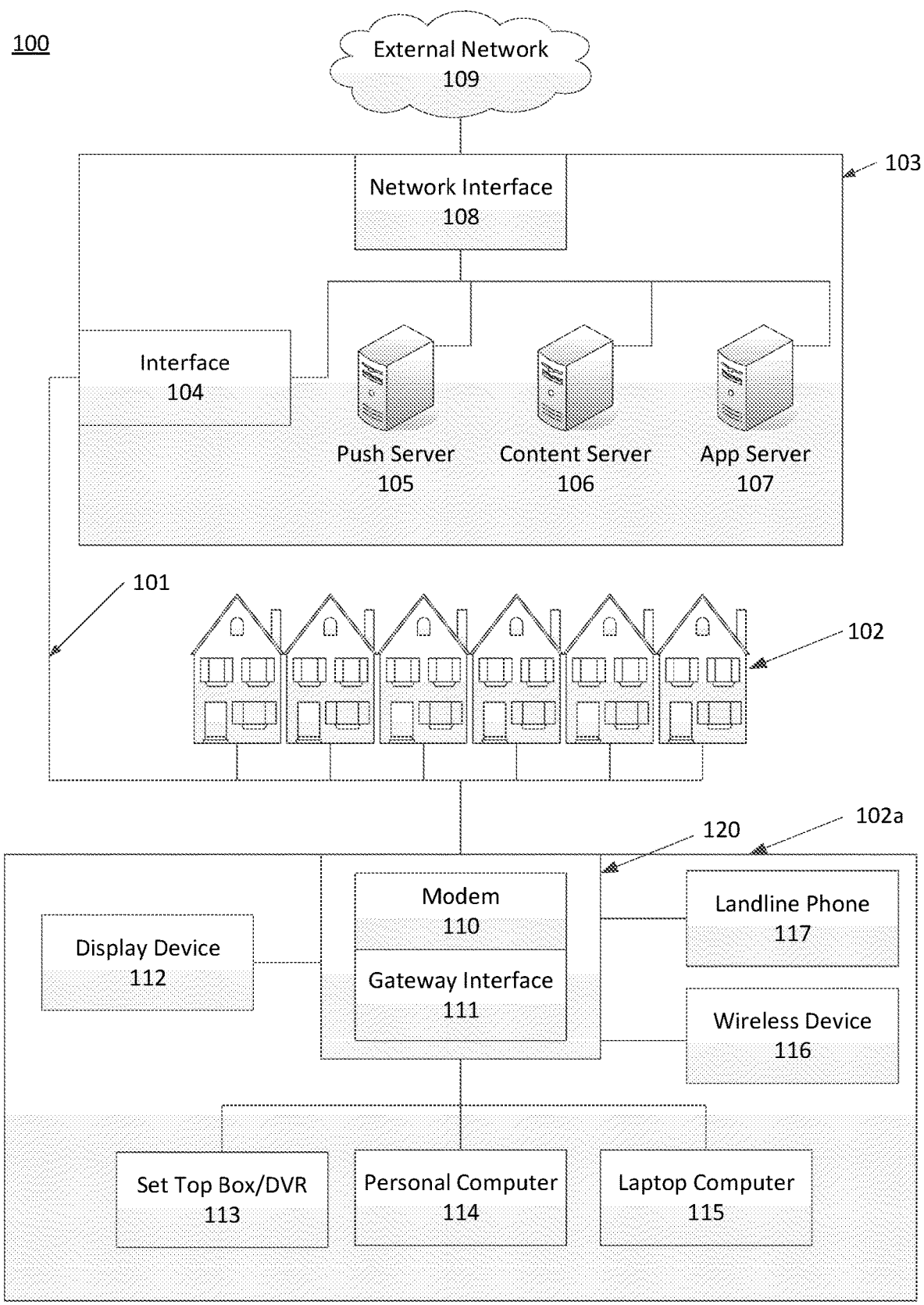
FIG. 1 illustrates an example system in which various features discussed herein may be implemented.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one or more links 101 originating from the local office 103, and it may be split a number of times to distribute the signal to the various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of the links 101 than before.

The local office 103 may include an interface 104, such as a termination system (TS). More specifically, the interface 104 may be a cable modem termination system (CMTS), which may be a computing device configured to manage communications between devices on the network of the links 101 and backend devices such as the servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include one or more push notification servers 105. The push notification server 105 may generate push notifications to deliver data and/or commands to the various premises 102 in the network (or more specifically, to the devices in the premises 102 that are configured to detect such notifications)

The local office 103 may also include one or more content servers 106. The content server 106 may be one or more computing devices that are configured to provide content to users at their premises. This content may be, for example, advertisements (such as commercials), video on demand movies, television programs, songs, text listings, etc. The content server 106 may include software to validate user identities and entitlements, to locate and retrieve requested content, to encrypt the content, and to initiate delivery (e.g., streaming or downloading) of the content to the requesting user(s) and/or device(s). The content server 106 may also be configured to generate advertising decisions and rules, and transmit them to a requesting user or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. As another example, the application server or another server may be responsible for monitoring user viewing habits and collecting that information for use in selecting advertisements. As another example, the application server or another server may be responsible for formatting and inserting advertisements in, for example a video stream being transmitted to the premises 102. Yet the application server or another application server may be responsible for associating interactive components into and with content and/or advertisements. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111, such as a gateway, may be a computing device that communicates with the modem(s) 110 to allow one or more other devices in the premises 102a, to communicate with the local office 103 and other devices beyond the local office 103. The gateway interface device 111 may be a set-top box, digital video recorder (DVR), computer server, or any other desired computing device. The gateway interface device 111 may also include (not shown) local network interfaces to provide communication signals to requesting entities/devices in the premises 102a, such as the display devices 112 (e.g., televisions), the additional set-top boxes or the DVRs 113, the personal computers 114, the laptop computers 115, the wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), the landline phones 117 (e.g. Voice over Internet Protocol-VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
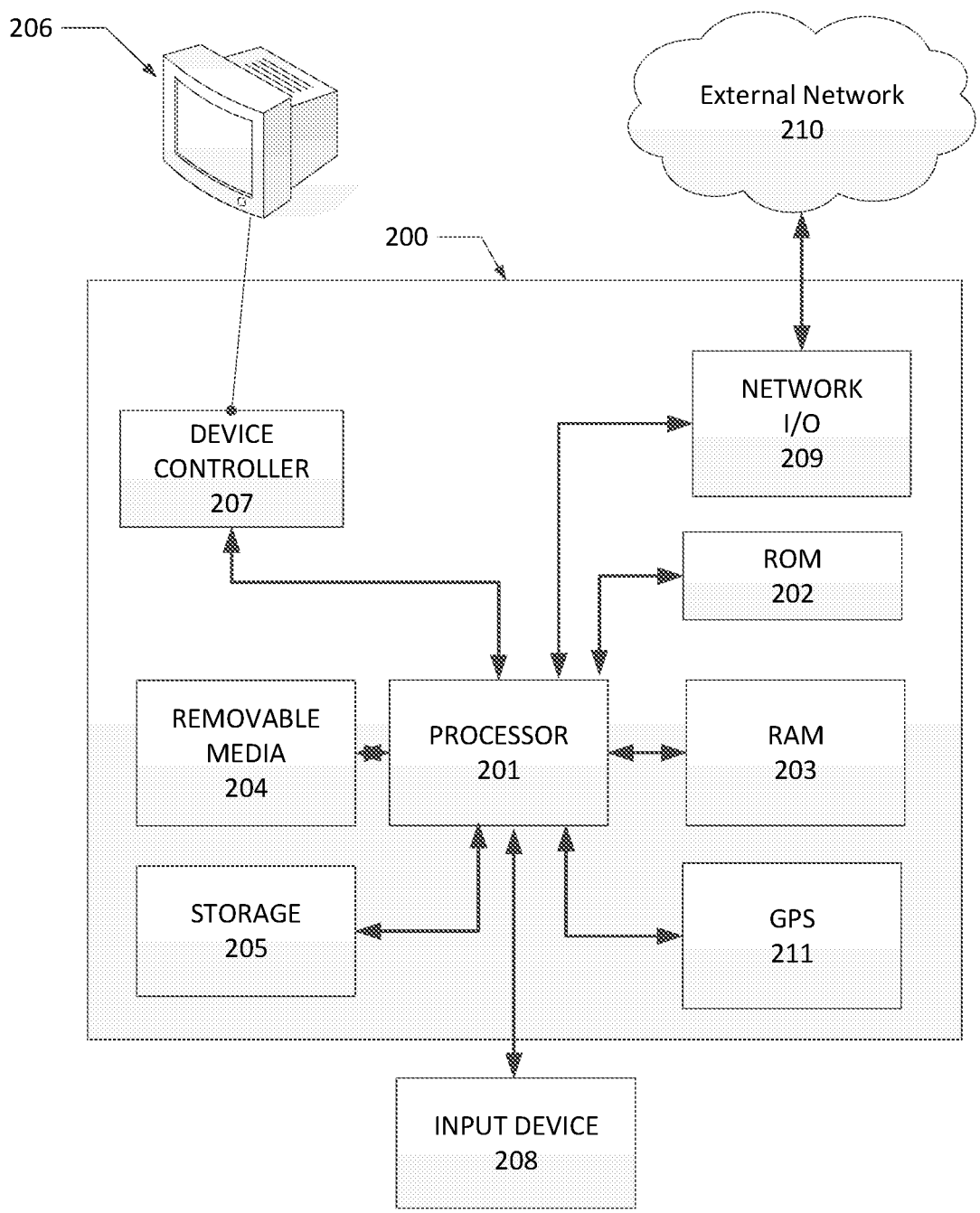
FIG. 2 illustrates an example computing device and network environment that may be used to implement one or more aspects of the disclosure.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) storage 205, such as a hard drive. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

FIG. 2 shows an example hardware configuration. Modifications may be made to add, remove, combine, divide, etc., components as desired, and some or all of the elements may be implemented using software. Additionally, the components illustrated may be implemented using basic display devices and components, and the same components (e.g., the processor 201, the ROM 202, the display 206, other input/output devices, etc.) may be used to implement any of the other display devices and components described herein. For example, the various components herein may be implemented using display devices having components such as a processor executing computer-executable instructions stored on a computer-readable medium (e.g., the storage 205), as illustrated in FIG. 2.

Having described examples of network environments and content consumption devices that may be used in implementing various aspects of the disclosure, several examples will now be described in greater detail illustrating how a display device may monitor user actions during an advertisement, a display device may restrict a user's control of the display device during an advertisement, and efficacy file reports are created and used. The consumption device, which may be a user's tablet computer, personal computer, smartphone, DVR, or any other computing device as described herein, may monitor any client-side interaction with the user during an advertisement, such as detecting a change in audio level or order of display elements. In other examples, the display device may prohibit a user from muting an advertisement during play.

Figure 3:
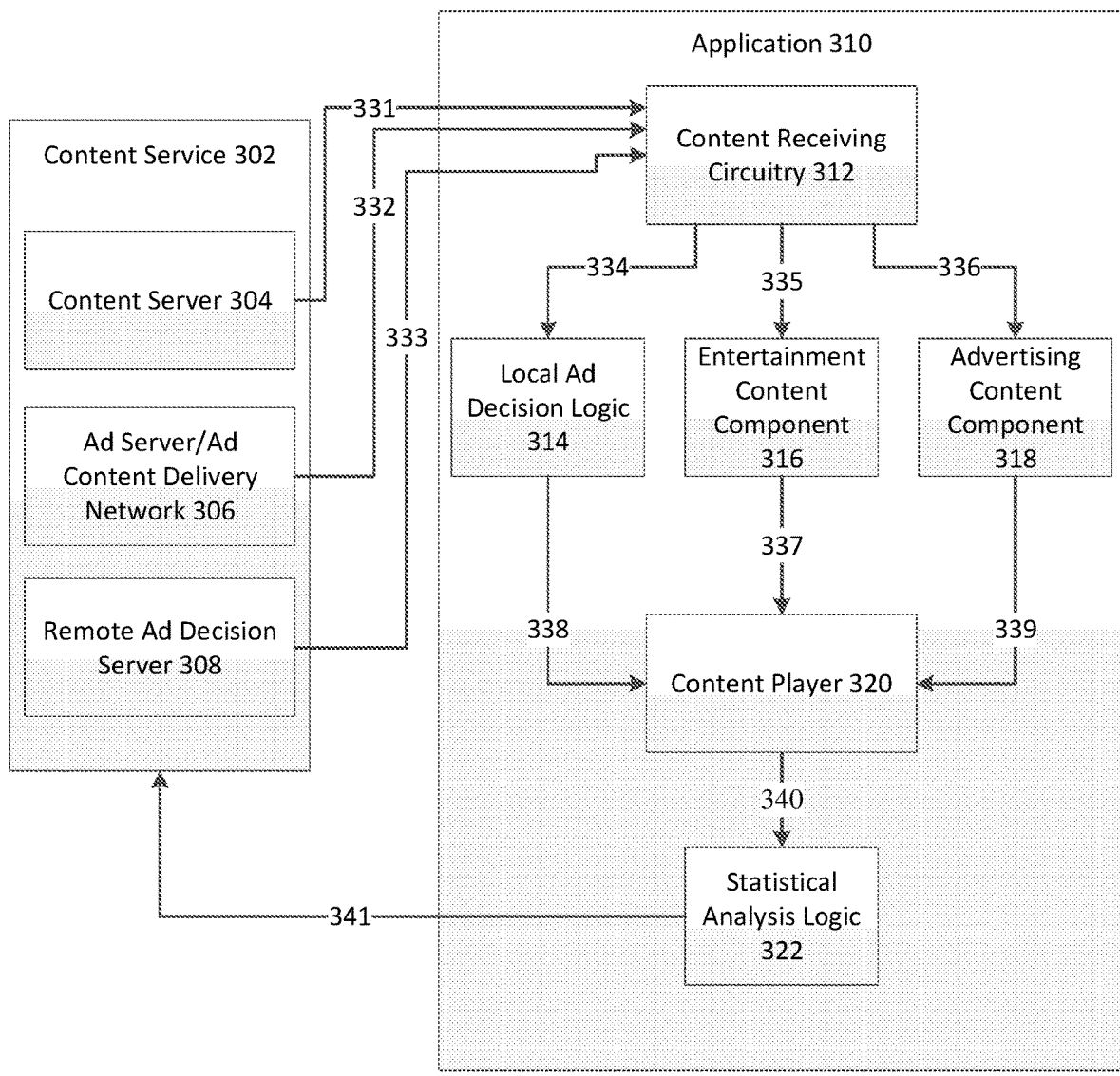
FIG. 3 illustrates an example system for providing content, such as entertainment content and advertising content, from a content service to an application, in accordance with one or more disclosed features described herein.

FIG. 3 illustrates a system 300 for providing content, such as entertainment content and advertising content, from a content service to an application, in accordance with one or more disclosed features described herein. In particular, the system 300 may include a Content Service 302, which may located or associated with headend 103, and/or may be a configuration of one or more computing devices or servers, such as the servers 105, 106, and 107. The Content Service 302 may include a Content Server 304, the Ad Server/Ad Content Delivery Network 306, and the Remote Ad Decision Server 308. The system 300 may also include an application 310, which may be, for example, part of or included in a device 301, such as a mobile device or computing equipment, which may be associated with the premises 102. Device 301 may be similar to or the same as computing device 200, display device 112, modem 110, gateway interface 111, landline phone 117, wireless device 116, set-top box/DVR 113, personal computer 114, laptop computer 115, or combinations thereof. The application 310 may be a client application and may include the Content Receiving Circuitry 312, a Local Ad Decision Logic 314, an Entertainment Content Component 316, an Advertising Content Component 318, a Content Player 320, and a Statistical Analysis Logic 322. The Content Service 302 may be operably connected to the application 310 through a network, such as the network 100.

According to some aspects, the application 310 may receive content, such as video, audio, and advertisements, from the Content Service 302. For example, as shown by step 331, content, such as entertainment video content (e.g., music, television show episodes, movies, sporting events, etc.), may be transmitted (e.g., streamed or downloaded) from the Content Service 302, such as from the Content Server 304, and stored on the application 310, such as in the Content Receiving Circuitry 312.

As shown by step 333, advertising decisions, which may be advertising rules comprising instructions for controlling the accessibility and insertion of advertising in, for example, entertainment content, may be transmitted (e.g., streamed or downloaded) from the Content Service 302, such as from Remote Ad Decision Server 308, and stored on the application 310, such as in the Content Receiving Circuitry 312. The advertising rules may contain various configuration settings and instructions for advertising delivery and playback. For example, the rules may include instructions for selecting targeted advertisements for a user and/or device. This will be explained in more detail below. The configuration instructions may be downloaded as part of a content download, such as with entertainment or advertising content, and may contain various configuration settings and data for the content delivery. The configuration data may include information identifying a timeline for the content, and indicating what advertisements are scheduled to be presented, and at what playback times they are to be presented. The configuration information may also identify an address for one or more advertising servers, such as the Ad Server/Ad Content Delivery Network 306 and the Remote Ad Decision Server 308, which may receive reports of the user's advertisement consumption behavior, for example.

The rules may also allow the application 310 to determine which portions of the video content constitute advertisements, and may also allow the application 310 to determine the viewing parameters to monitor for the advertisement, such as the whether it is obstructed, audio level, order, and the like. For example, it may be desirable for content providers to obfuscate where advertisements begin and end so that individuals may not construct unauthorized devices to detect and bypass the ads. However, the rules may include certain trusted authorities that are provided with data associated with information concerning when ads start and stop within a particular program stream. This may be contained within an encrypted header and/or periodically be disbursed in the program content stream. It may also be distributed out of band by the content provider and associated with certain content streams. In certain circumstances, the advertisement content information may include time codes, block frame codes and/or other MPEG data identifying certain segments which contain advertisements. This identifying information may then be utilized to push out ads either in real time and/or during DVR and/or VOD playback of the content to keep the ads fresh and current with an advertising campaign. The rules may include a list of advertisements, the location from where the advertisements may be acquired, as well as the rules for what, when, and how the advertisements may be played back. The rules may include whether advertisements may be played back multiple times or only once, whether advertisements can stop playing after a number of days, or if the advertisements can never stop playing. The rules may also include whether advertisements start on a particular day, such as a particular number of days after download, before and/or after a particular day, such as a holiday or birthday, and the like. The rules may also include a maximum or minimum number of times an advertisement may be displayed, such as during a piece of content or before the advertisement is replaced with another advertisement during a refreshing period. The rules may also include how advertisements may be displayed with respect to one another. For example, advertisements from two different car manufacturers may not be played adjacent to one another, and the rules may reflect this (e.g., competitive adjacency). The rules can also reflect which advertisements the advertisers are paying the most to display, and may provide these advertisements with priority. The rules may also include a location of a user and/or device, and determine advertisements based on the location. The rules may also include information regarding a type of device and/or a value associated with the device, and determine whether to play advertisements associated with expensive/inexpensive products based on the type of device and/or the value associated with the device and/or a predicted user of the device.

As shown by step 332, other content, such as advertising content (e.g., advertisements), may be transmitted (e.g., streamed or downloaded) from the Content Service 302, such as from the Ad Server/Ad Content Delivery Network 306, and stored on the application 310, such as in the Content Receiving Circuitry 312. Advertising content may comprise many kinds of content, such as a video and/or audiovisual advertisement (e.g., television commercials, movie previews, product or service commercials, etc.), an audio advertisement, a still image advertisement (e.g., a web banner advertisement), an interactive advertisement (e.g., an interactive television (ITV) enabled banner advertisement), and/or a combination thereof. For example, advertisement content may include linear television commercials (e.g., broadcast commercials scheduled to play at a particular time and on a particular channel), on-demand commercials (e.g., commercials delivered with video on demand (VOD), video from a digital video recorder (DVR), and/or other advertisements dynamically inserted in content such as VOD, Linear TV, DVR programs, program guide content, and/or other content such as content displayed using a web browser application), Internet television player application (e.g., advertisements delivered using an Internet Protocol television (IPTV)), smart phone, tablet, watch, car display, and/or other content display devices. User devices may run a web browser and/or Internet player. Advertisement content displayed in web browsers and/or Internet players may include still image advertisements (e.g., a picture, such as a banner advertisement or other mobile advertisement), online video advertisements, audio advertisements, and/or combinations thereof.

Any content item (e.g., advertisements, video, audio, image, and the like) may be available on multiple platforms, such as cell phone-based platforms, set top box based platforms, and the like. For example, an advertisement from a company may be available as a linear television advertisement, an advertisement inserted into a video on demand program, and/or a web banner advertisement. A single location (such as the local office 103) may process content items for all of the available types of platforms. Alternatively, different locations may process content items having different types of platforms. For example, a content server, such as the server 106 may handle content items configured to be displayed by a display device of a terminal such as a set-top box 113. These content items may include, for example, a video commercial for a linear television show, a video commercial for an on demand movie, and other types of content presentable by the terminal. A network server, on the other hand, may handle content items configured to be displayed on a web browser application and/or Internet media application running on a device. These content items may include, for example, web banners, online video clips, and other types of content displayable using a web browser or other Internet media application.

By tracking a user's activities throughout multiple platforms, an advertising server may target an advertising campaign at the user using multiple different devices and multiple content streams to deliver a unified and managed advertising campaign tailored to a specific user through multiple sources and organized in a coherent manner until a certain predetermined number of impressions of each segment of the advertising campaign have been presented to a particular user.

Referring again to step 332, the Ad Server/Ad Content Delivery Network 306 may use instructions transmitted to the Content Receiving Circuitry 312 to determine, for example, which types of advertisements to transmit to the application 310, such as used in a targeting scheme. This will be discussed in greater detail below. According to some aspects, content transmitted from the Content Service 302 may be performed via a network (online state), such as the network 100, and may be performed via communication link 101. Alternatively or additionally, after content has been transmitted to the application 310, a device that is associated or includes the application 310 may be disconnected from the network (offline state), such as the network 100. In this aspect, content and advertisements may be downloaded and stored on the device 301 and/or the application 310.

After content, such as entertainment content, advertising content, and advertising decisions, has been transmitted to the application 310, content may be played back using, for example, the application 310. For example, at step 334, advertising decisions may be provided to the Local Ad Decision Logic 314 from the Content Receiving Circuitry 312, at step 335, entertainment content may be provided to the Entertainment Content Component 316 from the Content Receiving Circuitry 312, and/or at step 336, advertising content may be provided to the Advertising Content Component 318 from the Content Receiving Circuitry 312. After a user, for example, requests to play a desired piece of content, such as a sitcom episode, the Content Player 320 may pull the episode from the Entertainment Content Component 316 shown by step 337, and may begin to play and display the episode for the user. In response to this request to play the content, the Content Player 320 may then call (e.g., function call) the Local Ad Decision Logic 314, shown by step 338, for instructions regarding, for example, which advertisements to play, where to insert advertisements in the content, and the like. The Local Ad Decision Logic 314 may then examine the advertising rules provided to it by the Content Receiving Circuitry 312 and may instruct Content Player 320 based on these rules. Using these instructions, the Content Player 320 may select and play advertisements, such as provided by the Advertising Content Component 318 shown by step 339.

According to some aspects, as shown by step 340, statistical data may be captured by the application 310, such as by the Statistical Analysis Logic 322. Statistical data may include data related to a profile of a user, device profile associated with the device, user habits, viewed content, device information, stored content, geolocation associated with a user or the device (using, e.g., a GPS device, such as the GPS 211), and the like. Statistical data may also include information derived from analyzing which types of content a user has on a device, a frequency or a number of times a user accesses a particular piece of content, and the like. Statistical data may also include information regarding advertisements displayed and/or not displayed on, for example, the device 301. Additionally, statistical data may include information regarding which advertisements may have been played while the device 301 is in an offline state. In general, statistical data may be any information used in the targeting of advertisements, and may form a basis of the advertising rules that control the display of advertisements.

For example, information regarding whether a user has actually watched an advertisement may be included in the statistical data. This may include information regarding whether a user fast forwarded through an advertisement, which point during the advertisement the fast forwarding began, how much of the advertisement was watched in either a regular speed, a fast forward speed, or a slow-motion speed, whether a user rewound content to view an advertisement content again, and the like. In this aspect, beacon events may be used to determine how much of an advertisement was played, and this may be used to determine if a particular advertisement or group of advertisements was actually viewed and/or heard. For example, measurement of data for each of the advertisement views and a percentage of the advertisement views may be determined. For example, if an advertisement lasts 60 seconds, a metric event may be determined at the 0, 15, 30, 45, and 60 second mark. If a beacon event associated with this advertisement is set to register the advertisement as being "viewed" at 30 seconds, then when a user, for example, initiates a fast forwarding of the advertisement at 10 seconds, the metric event taken at the 15 second mark may not satisfy the beacon event of having viewed the advertisement for 30 seconds (e.g., in regular speed). However, if the user initiates a fast forwarding at 35 seconds, then the metric event taken at the 45 second mark will satisfy the beacon event of 30 seconds. Metric events and beacon events may be set to be any specific length or period of time. Additionally, other aspects besides fast forwarding may be used, such as pausing, slow motion, rewinding, muting, switching to other content, switching to another application, turning a device or application on/off, and the like.

Additionally, statistical data may include information regarding interactive components associated and/or integrated with content, such as advertisements (e.g., direct response advertisements). For example, while an advertisement is playing, an interactive component, such as a clickable link or picture, may be integrated with the advertisement. If a user accesses, such as by clicking, the link or picture, the user may be brought to, for example, a website, associated with the advertisement or may be presented with a coupon or discount associated with the advertisement. Additionally, with regard to the beacon event aspect, if a user were to access an interactive component before the beacon event threshold mark, such as at 15 seconds for a 30 second beacon event in the previous example, the advertisement may be counted as being "viewed," and the beacon event may be satisfied. Alternatively, the beacon event may not be satisfied even if an interactive component may have been accessed, and thus may require a metric event be determined at a predetermined second mark.

According to some aspects, as shown by step 341, the Statistical Analysis Logic 322 may transmit information, such as statistical data, back to the Content Service 302, such as to the Remote Ad Decision Server 308. The Statistical Analysis Logic 322 may transmit statistical data to the Content Service 302 after the device 301 connects to a network. For example, while the device 301 is in an offline state, the Statistical Analysis Logic 322 may collect and store statistical data on the device 301 and/or the application 310. Stored statistical data may be locally used by the Local Ad Decision Logic 314 to update some of the advertising rules stored locally on the device 301 and/or the application 310. This aspect will be discussed further below. After some of the advertising rules may have been updated, the Local Ad Decision Logic 314 may implement these updates, such as in real-time, after a subsequent request to play a piece of content, while a piece of content is currently playing, while a piece of content is not currently playing, and the like. For example, if statistical data determines that the device 301 includes a lot of content associated with sports, then some of the advertisement rules may be modified and/or supplemented to reflect this. The Local Ad Decision Logic 314 may then instruct the Content Player 320 to play advertisements associated with sports either, for example, immediately, at the next advertisement break, at a subsequent time the content is displayed, not at all, and the like. If the device 301 is connected to a network, for example, then the stored statistical data may be transmitted to the Remote Ad Decision Server 308. The Remote Ad Decision Server 308 may then provide updated or additional rules to the Content Receiving Circuitry 312 based on the statistical data. For example, as in the above sports example, the Remote Ad Decision Server 308 may transmit to the Content Receiving Circuitry 312 instructions to play, for example, more advertisements related to sports. Then the Ad Server/Ad Content Delivery Network 306 may use these updated rules to determine, for example, which types of advertisements to transmit to the Content Receiving Circuitry 312. The updated rules may then be used by the Local Ad Decision Logic 314 to instruct the Content Player 320 to play particular advertisements from the Entertainment Content Component 316.

Note that FIG. 3 is merely an example. The configuration of FIG. 3 may be added to, modified, or rearranged to fit the needs of an advertiser, service provider, and/or display device. The same is true for the other examples and processes described herein.

Figure 4:
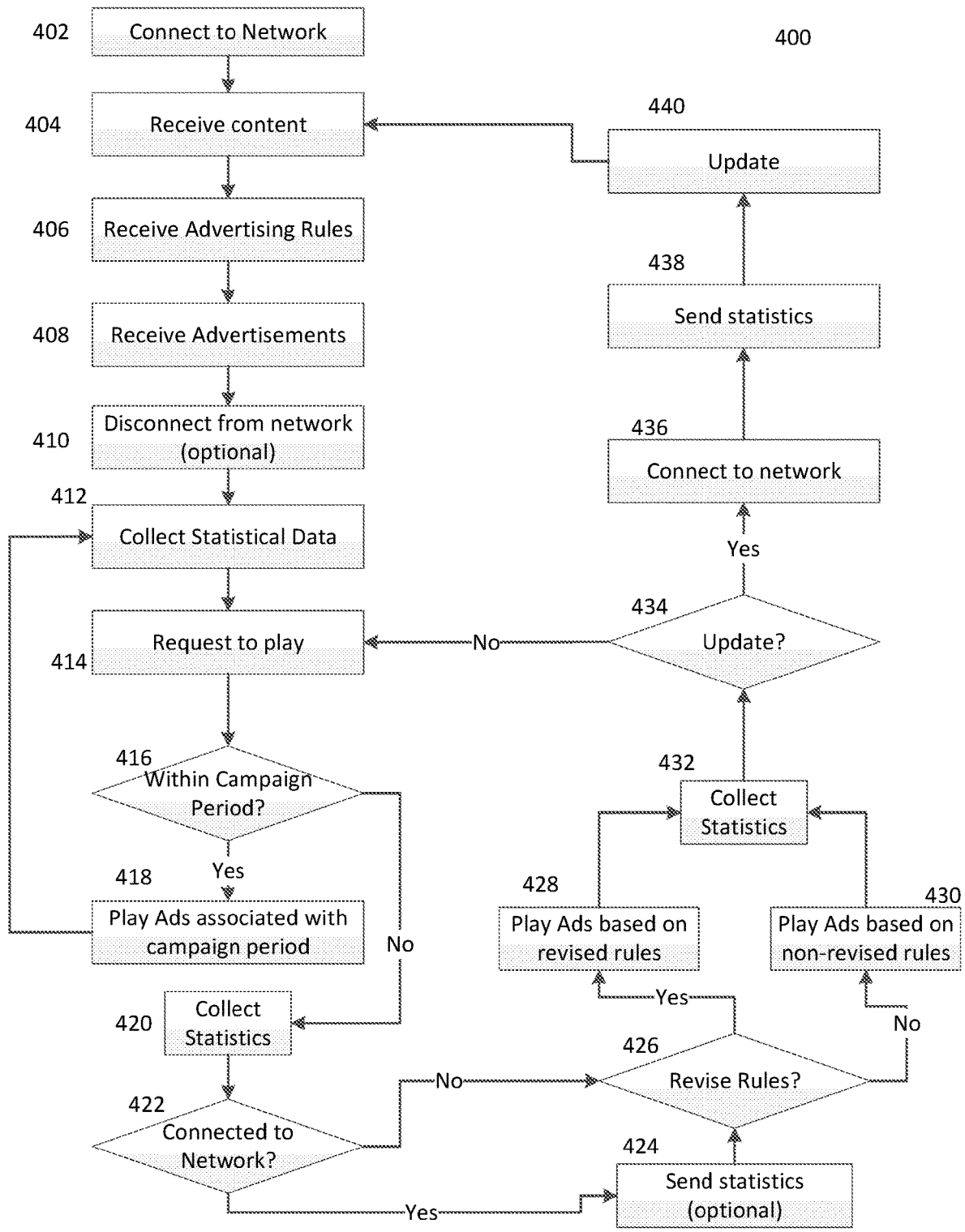
FIG. 4 is a flow diagram illustrating an example process of providing content and advertisements from a content service to an application, in accordance with one or more disclosed features described herein.

FIG. 4 is an exemplary flow diagram illustrating an example process 400 of providing content and advertisements from a content service to an application, in accordance with one or more disclosed features described herein. In one or more embodiments, the process illustrated in FIG. 4 and/or one or more steps thereof may be performed by one or more computing devices (e.g., the device 301, servers associated with the Content Service 302, and the like). In other embodiments, the process illustrated in FIG. 4 and/or one or more steps thereof may be embodied in computer-executable instructions that are stored in a computer-readable medium, such as a non-transitory computer-readable memory. The steps in this flow chart need not all be performed in the order specified and some steps may be omitted and/or changed in order.

In the example provided, process 400 may begin with step 402, in which the device 301 may connect to a network, such as the network 100, which may be associated with the Content Service 302. The network may connect the device 301 to the Content Service 302. For example, the Content Service 302 may transmit information, such as content and rules, to the device 301, which may then use an application, such as the application 310, to access the content and/or rules.

In step 404, content, such as entertainment content, may be received by the device 301. This content may be transmitted to the device 301, such as to the Content Receiving Circuitry 312, from the Content Service 302, such as from the Content Server 304. The content may either be downloaded by the device 301 and/or streamed from the Content Service 302. For example, the content may be delivered and subsequently downloaded using a HTTP Live Streaming (HLS) fragmented video format. HLS format may provide an easy modification after a piece of content is downloaded by the device 301, which may enable the application 310 to insert, interweave, or "stitch in" advertising or other content into a piece of content (e.g. at the beginning, during, or after the playback of the content). According to some aspects, the content format comprises linear video, on demand video, or DVR video. Thus, advertisements can be inserted linearly in the middle of a video based on the advertising rules. Additional video formats and protocols for delivery may be used, such as FTP, UDP, MPEG, DVB, H.264, and the like.

In some embodiments, the device 301 may download content having an accessibility period (AP). The accessibility period may be a period of time or a number of times a piece of content may be played. For example, a piece of content with an accessibility period of two weeks may be viewed for two weeks before having to connect to the Content Service 302 to, for example, update a license agreement before continuing to watch that piece of content. Additionally, a piece of content with an accessibility period of thirty views may be viewed for thirty times before having to connect to the Content Service 302 to, for example, update a license agreement. Thus, the device 301 may not come back online (i.e., connect to the Content Service 302), for the entire duration of an accessibility period of a piece of content.

In step 406, advertising rules may be received by the device 301. The advertising rules may be transmitted to the device 301, such as to the Content Receiving Circuitry 312, from the Content Service 302, such as from the Remote Ad Decision Server 308. The advertising rules may be either downloaded by the device 301 and/or streamed from the Content Service 302. The advertising rules may contain various configuration settings and instructions for advertising delivery and playback. The advertising rules may interact and/or be associated with the metadata of advertisements delivered to the device 301, such as when targeting using targeted advertisements. For example, statistical data, such as information related to device 301 or a user of device 301, may be used to create, modify, or supplement advertising rules. The advertising rules may include instructions on which advertisements to play when the device 301 is in an offline state. Thus, as in the above example, where the content has an accessibility period, the device 301 may not come back online for the entire duration of an accessibility period of a piece of content, the advertising rules may be used to determine which advertisements to play during the offline period. Thus, if a piece of content has an accessibility period of two weeks, then the rules may determine which advertisements to play, for example, for the first three days, the next three days, the next five days, and so on. Additionally, the rules may determine which advertisements to play based on statistical data associated with the device 301 and/or a user associated with the device 301.

In step 408, advertisements may be received by the device 301. The advertisements may be transmitted to the device 301, such as to the Content Receiving Circuitry 312, from the Content Service 302, such as from the Ad Server/Ad Content Delivery Network 306. The advertisements may be either downloaded by the device 301 and/or streamed from the Content Service 302. The Ad Server/Ad Content Delivery Network 306 may communicate with the Remote Ad Decision Server 308 and/or the Content Receiving Circuitry 312 for advertising rules, and use the advertising rules to determine which advertisements to transmit to the device 301. The advertisements may include metadata which may be related to targeting, which may be controlled and/or associated with the advertising rules. Thus, as in the above example, if a piece of content has an accessibility period of two weeks and device 301 includes a substantial amount of content related to sports, then the Ad Server/Ad Content Delivery Network 306 may send to the Content Receiving Circuitry 312 enough advertisements to cover the entire two week period, and these advertisements may include advertisements associated with sports, such as advertisements related to sports bars, football, and BBQ grills, and the like. Thus, the application 310 may adapt to different rules to play different advertisements at different times when, for example, in an offline scenario. Alternatively or additionally, the above recited steps may be performed for advertisements that are streamed to the device 301 through a network from, for example, the Content Service 302.

In step 410, the device 301 and/or the application 310 may optionally disconnect from the network or be disconnected from each other in any other way. Alternatively or additionally, the device 301 and/or the application 310 may optionally disconnect or connect to a network (or each other in any other way) after any of the steps in process 400.

In step 412, the application 310 may optionally collect statistical data, for example by using the Statistical Analysis Logic 322. Statistical data may be used to create advertisements and/or advertising rules personalized or specific for a device or user associated with a device. Statistical data may include, data related to a profile of a user, device profile associated with the device, user habits, viewed content, device information, stored content, geolocation associated with a user or the device (using, e.g., a GPS device, such as the GPS 211). Statistical data may also include information derived from analyzing which types of content a user has on a device, a frequency or a number of times a user accesses a particular piece of content, and the like. Statistical data may also include information regarding advertisements displayed and/or not displayed on, for example, the device 301. Additionally, statistical data may include information regarding which advertisements may have been played while the device 301 is in an offline state Additionally, statistical data may optionally be collected while disconnected or connected from the network, and may be collected after any of the steps in process 400.

At step 414, a request to play content, such as entertainment content, may be received by the application 310. For example, a user may download an episode of a sitcom, such as from the Content Server 304, and then a day later, may decide to display and view the episode using the application 310 on the device 301. A user may then select the episode to watch. The device 301 may be in an online or offline state when a user requests to play content. As stated above, a piece of content may be associated with an accessibility period, which may limit the amount of time or number of views associated with the content. Thus, if a user selects to display the content within the accessibility period, then the content may be displayed to the user. If a user selects to display the content outside of the accessibility period, then the content may not be displayed to the user.

At step 416, it may be determined whether the request to play the content was made during a campaign period associated with the content. A campaign period may be associated with a measurement model used for broadcasters and video publishers, such that credit or currency may be given for content (such as advertising) while being broadcasted (i.e., live over TV), and subsequently on platforms that allow for streaming and/or downloading of the content after it has been broadcasted (i.e., on-demand, DVR, subscription based download, etc.) For example, after a show has been broadcasted, the show may be implemented for on-demand or DVR services on, for example, a digital platform. Thus, any viewing of a piece of content that takes place within the campaign period may count toward the credit or currency associated with the piece of content. The credit or currency may be, for example, used in determining how much to charge for a piece of content. A campaign period may be associated with any content. For example, a C3 campaign period metric may correspond to a time period of three days (72 hours) after a piece of content, such as a show, has been broadcasted. C5 may correspond to a period of 5 days, and so on. After the expiration of the 72 hours, a C3 campaign period may end. Thus, if a user requests to play the show within the C3 campaign period of 72 hours after broadcast, then the request is made during the campaign period. Alternatively, the campaign period can have a predetermined start and end date for a validity period.

Additionally or alternatively to the campaign period being a period of time, the campaign period may be set at a number of "displays" of the content. For example, for a piece of content having a campaign period of twelve "displays," the user may request that piece of content up to twelve times, and still be considered to have made the request within the campaign period. If, for example, the user requests the content a thirteenth time, the thirteenth request may be considered outside of the campaign period, because the campaign period may have expired after the twelfth request. In some embodiments, it may be determined that a request of a piece of content may not count as a "display" until a user has viewed a particular percentage of the content and/or advertisements associated with the content. In one example, a device may need to play 66% of the content and/or advertisements associated with the content to be considered a "display." However, any such percentage may apply.

Additionally or alternatively, some of the advertisements transmitted to the device 301 from the Ad Server/Ad Content Delivery Network 306 may be associated with the campaign period and some may not be associated with the campaign period. For example, an advertisement may be associated with the campaign period if it was played during the original broadcast. In another example, an advertisement may be associated with the campaign period if the advertising rules specify that the advertisement may be played during the campaign period.

Further, an advertisement not associated with a campaign period may be played after expiration of the campaign period. For example, after downloading a piece of content, the advertising rules may determine/instruct that three advertisement breaks are needed for that piece of content, and the Ad Server/Ad Content Delivery Network 306 may send three pods of advertisements to the application 310-a pre-roll pod of advertisements for before the content, a mid-roll pod of advertisements for during the content, and a post-roll pod of advertisements for after the content. Each pod may be composed of 4 advertisements, for example. One skilled in the art would recognize that any number of pods and/or advertisements per pod may be used with the features disclosed herein and that advertisements may be inserted into content at any insertion point in the content and not just the three listed above. Thus, in one example, the Remote Ad Decision Server 308 may determine that the content has an accessibility period of one week, and has a campaign period of three days (C3). The Remote Ad Decision Server 308 may then transmit rules based on this information to the Content Receiving Circuitry 312, and the Ad Server/Ad Content Delivery Network 306 may then send advertisements to the Content Receiving Circuitry 312 based on these rules. For example, the Ad Server/Ad Content Delivery Network 306 may send 24 advertisements to the Content Receiving Circuitry 312, with 12 initial advertisements (i.e., three pods of four advertisements each) being associated with the campaign period of C3, and may send 12 subsequent advertisements that may not be associated with the campaign period of C3. Thus, for any requests received by the application 310 to display this content within the C3 campaign period, at least a portion of the 12 initial advertisements may be inserted into the content and displayed. For any requests received at the expiration of the C3 campaign period (i.e., post 72 hours after broadcast), at least a portion of the 12 secondary advertisements may be inserted into the content and displayed. In some embodiments, the advertisements associated with the campaign period (e.g., the 12 initial advertisements as in the above example) may constitute advertisements that may not have been broadcasted. In some embodiments, the advertisements played after the expiration of the campaign period (e.g., the 12 secondary advertisements as in the above example) may comprise advertisements associated with the campaign period. For example, if it is determined that the device 301 includes a substantial amount of sports content, then a sports advertisement associated with the campaign period may be played after the expiration of the campaign period (i.e., a targeted advertisement). This may be implemented using statistical data, a modification of the advertising rules, and the like. Additionally, in some embodiments, the advertisements that are not associated with the campaign period may be associated with the campaign period. For example, if it is determined that the device 301 includes a substantial amount of sports content, then a sports advertisement not associated with the campaign period may be played during the campaign period (i.e., a targeted advertisement).

If it is determined at step 416 that the request for content is within a campaign period associated with the content, then the process continues to step 418. In step 418, advertisements associated with the campaign period may be played and displayed, such as described in the above examples. After playing the requested content and the advertisements, the process returns to step 412 to collect statistical data. The statistical data may include any of the information described above. The statistical data may include, for example, information regarding how many times the user played a piece of content within a campaign period, how long the user displayed the content for each request, whether the user selected an interactive component of an advertisement, whether the user has downloaded/accessed any additional content, and the like. The process then continues through steps 414-416. If it is determined at step 416 that the request for content is outside of a campaign period associated with the content, then the process continues to step 420.

In step 420, statistical data may be collected again. The statistical data may include any of the information described above. The statistical data may include, for example, information regarding how many times the user played a piece of content within a campaign period, how long the user displayed the content for each request, whether the user selected an interactive component of an advertisement, whether the user has downloaded/accessed any additional content, and the like.

In step 422, it may be determined whether the device 301 and/or the application 310 may be connected to a network and/or to the Content Service 302. If it is determined at step 422 that the device may be in an online state, then the process continues to step 424. At step 424, any portion of the collected statistical data may be, for example, transmitted to the Content Service 302, such as to the Remote Ad Decision Server 308. Then process 400 continues to step 426. If it is determined at step 422 that the device may be in an offline state, then the process continues to 426. One skilled in the art would recognize that the device 301 may be connected to the network at any time, and it is not required to be at any specific time or in the order shown in FIG. 4.

At step 426, advertising rules, such as on Remote Ad Decision Server 308 or the Local Ad Decision Logic 314, may be revised, modified, supplemented, or added based on, for example, the statistical information. Step 426 may be performed in an offline or online state. For example, if a user continues to watch a child's show over and over, then the rules may be updated to reflect this (i.e., based on a user's viewing habits), and may modify the rules to indicate playing more branding advertising instead of direct response advertising. In some embodiments, no modification may be needed (e.g., because a child may not be able to respond to a direct response advertisement and/or may not understand a direct response advertisement). The Local Ad Decision Logic 314 may then instruct Content Player 320 to play advertisements during a subsequent display of the content using either the modified advertising rules (step 428) or unmodified advertising rules (step 430).

In step 432, statistical data may be collected again. At step 434, it is determined whether any items, such as content, rules, and/or advertisements are to be updated and/or refreshed by the Content Service 302. If it is determined at step 434 that there may be no update, then the process returns to step 414. At step 414, the process may continue with a previous campaign period or with a subsequent campaign period. Please note, even though the campaign period may have expired, the campaign period may be extended based on the collected statistical data. For example, if it is determined that the user has a substantial amount of sports related content on the device, and there are one or more sports related advertisements associated with the first campaign period on the device, then the application 310 may extend the campaign period (such as using updated/revised advertising rules) to play the sports related advertisements. Additionally, based on the rules, advertisements may become associated with a campaign period. For example, if is determined that a user's device has a substantial amount of sports related content, then advertisements related to sports that were not previously associated with a campaign period, may become associated with a campaign period using the advertising rules. Alternatively or additionally, the sports related advertisements associated with the campaign period may be played after the expiration of the campaign period.

If it is determined at step 434 that any items, such as content, rules, and/or advertisements are to be updated by the Content Service 302, the process continues to step 436. At step 436, the device 301 and/or the application 310 may connect to the network and/or the Content Service 302. At step 438, statistical data may be transmitted to the Remote Ad Decision Server 308, which may be used to update advertising rules which may be used for advertising decisions. At step 440, updates may be implemented on the Content Service 302 using, for example, the stored statistical data. The process then returns to step 404, where the device 301 may receive content from the Content Service 302.

Note that FIG. 4 is merely an example. The steps of FIG. 4 may be added, modified, removed, combined, divided, or rearranged to fit the needs of an advertiser or display device. The same is true for the other examples and processes described herein.

Figure 5:
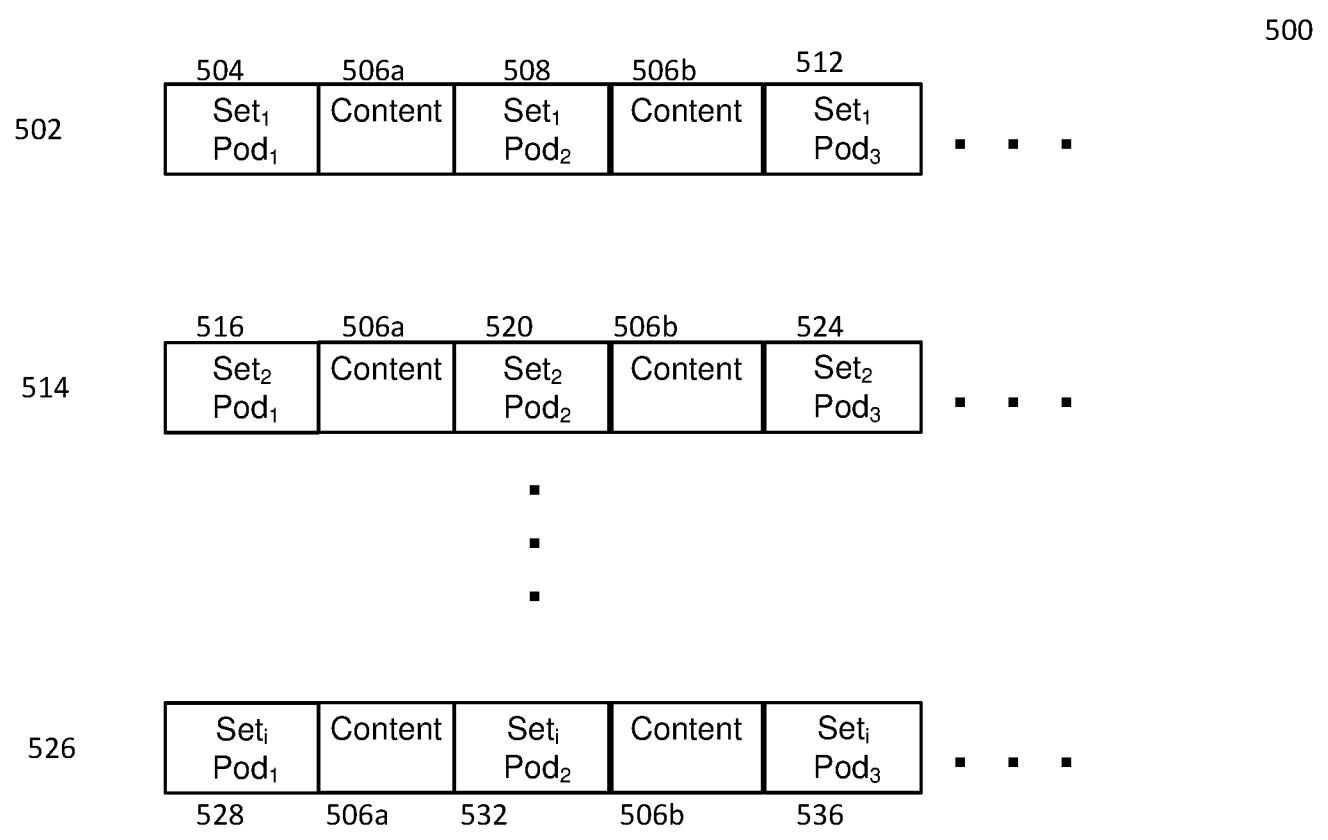

FIG. 5 illustrates a schematic chart 500 showing how advertisements may be stitched-in, interweaved, and/or inserted into content, in accordance with one or more features described herein. The chart 500 may include the advertisement/content segments, 502, 514, and 526, which may illustrate a displaying of advertisements and content at different times. The segment 502 may include one or more advertisement pods, such as the pods 504, 508, and 512, and one or more content parts 506a and 506b. The segment 514 may include one or more advertisement pods, such as pods 516, 520, and 524, and one or more content parts 506a and 506b. The segment 526 may include one or more advertisement pods, such as pods 528, 532, and 536, and one or more content parts 506a and 506b. The content parts 506a and 506b may be different parts of a single piece of content, such as two parts of an episode of a sitcom. The one or more advertisement pods may include one or more advertisements, and may include an equal or non-equal number of advertisements in each pod. For example, the pod 504 may include 6 advertisements, pod 508 may include 5 advertisements, and pod 512 may include 1 advertisement.

As stated above, the pods 504, 508, 512, 516, 520, 524, 528, 532, and 536 and the content parts 506a and 506b may be downloaded on a device, such as the device 301, and used by an application, such as the application 310. In one example, the segment 502 may be associated with a campaign period, such as the C3 metric described above. Thus, for a period of three days from the content's broadcast, advertisements shown in the segment 502 may be associated with the C3 metric. After the expiration of the three days, a playback sequence may resemble the segment 514, in which a new set of pods, which may or may not include some of the advertisements associated with the C3 metric, may be inserted into content and displayed. Advertisements associated with the segment 514 may be associated with a different campaign period, such as a campaign period of displaying the content a predetermined number of times (e.g., 1, 2, 15, or 200 times, etc.). It is noted that advertisements may be associated with multiple campaign periods. Advertisements may also be displayed and/or reused based on campaign period, statistical data, advertising rules, and the like. Further, the advertisements associated with the segment 514 may not be associated with a campaign period. Additional advertisements may be displayed based on, for example, statistical data. As stated above, advertisements may be reused after the expiration of a campaign and/or at a different time period. Advertisements in the segment 526, for example, may occur subsequent to any campaign periods associated with the segments 502 and/or 514, and may contain a portion of the advertisements used in the segments 502 and/or 514.

In some embodiments, the pods 504, 508, and 512 may be received by the device 301 as a first set of advertisements, the pods 516, 520, and 524 may be received as a second set of advertisements, and the pods 528, 532, and 536 may be received as an "ith" set of advertisements. The first set of advertisements may be interwoven into content, such as the content parts 506a and 506b. At another time period, the second set of advertisements may be interwoven into content, such as the content parts 506a and 506b. At another time period, the ith set of advertisements may be interwoven into content, such as the content parts 506a and 506b. In such embodiments, the device 301 and/or the application 310 may or may not be connected to a content service, such as the Content Service 302, and/or to a network, such as the network 100, which may be associated with a content service, such as the Content Service 302.

In accordance with one or more of the features described herein, content may be downloaded to a device, such as the device 301. The content may be subscription based, such as a user or device subscribing to a premium channel or service. Content may be downloaded and then played for a predetermined time period while the device may not be connected to a network. The device may not come back online for the entire duration of the accessibility of that content. Once reconnected to the network, the content may be refreshed, and the offline viewing period may be extended. Thus, there may be a long duration of time in which a device may not be able to obtain fresh content. Thus multiple advertising loads for a single content asset may be downloaded, such as at a single time or during multiple times, and can be selected for display in a piece of content at different times while the device is offline. Advertisement may have different periods of validity, and after a period of validity, advertisements may or may not be shown again. When a device is offline, there may not be a way to call a remote advertisement service to determine which advertisements to play. Advertising decisions may need to be made in real-time and on demand. Thus, when playing a piece of content on a streaming service, part of the communication received by the device may include decisions regarding which advertisements to play for the content that is about to be played. These decisions can be received from, for example, a remote advertisement server or from a local advertisement decision service resident on a device, where the local advertisement decision service may use rules that have been downloaded to the device. The local advertisement decision service may instruct a content player to play advertisements stored on the device. The local advertisement decision service may provide various types of advertisement responses to adapt to different rules to play different advertisements at different times in an offline scenario. Advertisements stored on a device may be selected on the basis of stored content on the device. These advertisements then may be dynamically inserted into content, such as content stored on the device, based on advertising rules. Alternatively, the local advertisement decision service may instruct a content player to play advertisements streamed to the device.

In accordance with one or more of the features described herein, a piece of content may be played multiple times in an offline content, and advertisements displayed with that content may be changed during different display periods for the context. Multiple advertisement loads may be downloaded and stored along with advertising rules that may be associated with the downloaded advertisements. The rules may determine, for example, the way in which advertisements may be rotated. The playback device may respond to those rules and replace the advertisements according to those rules when the content is played multiple times.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
    downloading, by a user device:
        from a first server, content comprising one or more advertisement opportunities; and
        from one or more second servers:
            rules for controlling insertion of advertising in the content; and
            a plurality of advertisements, based on the rules, for the one or more advertisement opportunities, wherein:
                a first portion of the plurality of advertisements is for a campaign period; and
                a second portion of the plurality of advertisements is for a subsequent period to the campaign period;
    receiving a request to output the content;
    selecting, by the user device, based on the request to output the content, based on the downloaded rules, and instead of contacting a remote server for an additional advertisement, a downloaded advertisement from the downloaded plurality of advertisements; and
    causing output, by the user device, of the content with the selected downloaded advertisement inserted in one of the one or more advertisement opportunities, wherein the selected downloaded advertisement is from the first portion if the outputting is during the campaign period or the selected downloaded advertisement is from the second portion if the outputting is during the subsequent period to the campaign period.

2. The method of claim 1, wherein the causing output comprises causing output, by the user device during the campaign period, of the content with a downloaded advertisement from the first portion, the method further comprising:
    causing second output, by the user device after the campaign period, of the content with a downloaded advertisement from the second portion.

3. The method of claim 1, wherein the first server comprises a content server and the one or more second servers comprise an advertisement content server and an advertisement decision server, the method further comprising sending, to the content server, a request to download the content, wherein the downloading comprises:
  downloading, from the content server and based on the sent request to download the content, the content;
  downloading, from the advertisement decision server, the rules, wherein the rules indicate the campaign period; and
  downloading, from the advertisement content server, the plurality of advertisements, wherein the plurality of advertisements are selected by the advertisement content server based on the content and on the rules.

4. The method of claim 1, wherein the rules indicate the campaign period and are received from the one or more second servers based on information associated with a user of the user device.

5. The method of claim 1, further comprising determining, based on applying the rules to a local advertising decision service executing the user device and based on content stored on or output by the user device, that an advertisement of the plurality of advertisements is in the second portion.

6. The method of claim 1, wherein the downloading the plurality of advertisements comprises:
  downloading the first portion, of the plurality of advertisements, in a first quantity of advertisements, wherein the first quantity is based on a total quantity of the one or more advertisement opportunities and on the campaign period; and
  downloading the second portion, of the plurality of advertisements, in a second quantity of advertisements, wherein the second quantity is based on the total quantity of the one or more advertisement opportunities and on an accessibility period of the content.

7. The method of claim 1, wherein the campaign period comprises one or more of:
  a period of time;
  a quantity of outputs of the content; or
  a quantity of outputs of one or more advertisements from the first portion of the plurality of advertisements.

8. The method of claim 1, further comprising:
  determining that output, during the caused output of the content with the selected download advertisement inserted in the advertisement opportunity, of the selected download advertisement satisfies a criteria; and
  storing, based on the determining that the output of the selected downloaded advertisement satisfies the criteria, an indication of the output of the selected downloaded advertisement.

9. The method of claim 1, further comprising modifying, by the user device based on one or more content items stored on the user device, the downloaded rules, wherein the selecting the downloaded advertisement is based on the modified downloaded rules.

10. The method of claim 1, wherein the user device comprises a set-top box, and wherein the causing output comprises causing output via a display associated with the set-top box.

11. The method of claim 1, wherein the rules indicate the campaign period and an accessibility period of the content, and wherein a quantity of the downloaded plurality of advertisements is based on the campaign period and the accessibility period of the content.

12. The method of claim 1, wherein the user device comprises a digital video recorder.

13. The method of claim 1, wherein the user device comprises a laptop computer.

14. An apparatus comprising:
  one or more processors; and
  memory storing instructions that, when executed by the one or more processors, configure the apparatus to:
    download:
      from a first server, content comprising one or more advertisement opportunities;
      from one or more second servers:
        rules for controlling insertion of advertising in the content; and
        a plurality of advertisements, based on the rules, for the one or more advertisement opportunities, wherein:
          a first portion of the plurality of advertisements is for a campaign period; and
          a second portion of the plurality of advertisements is for a subsequent period to the campaign period;
    receive a request to output the content;
    select, based on the request to output the content, based on the downloaded rules, and instead of contacting a remote server for an additional advertisement, a downloaded advertisement from the downloaded plurality of advertisements; and
    cause output, by the apparatus, of the content with the selected downloaded advertisement inserted in one of the one or more advertisement opportunities, wherein the selected downloaded advertisement is from the first portion if the outputting is during the campaign period or the selected downloaded advertisement is from the second portion if the outputting is during the subsequent period to the campaign period.

15. The apparatus of claim 14, wherein the instructions, when executed by the one or more processors, configure the apparatus to:
  cause the output of the content by causing output, during the campaign period, of the content with a downloaded advertisement from the first portion; and
  cause second output, after the campaign period, of the content with a downloaded advertisement from the second portion.

16. The apparatus of claim 14, wherein the first server comprises a content server and the one or more second servers comprise an advertisement content server and an advertisement decision server, and wherein the instructions, when executed by the one or more processors, further configure the apparatus to:
  send, to the content server, a request to download the content;
  download, from the content server and based on the sent request to download the content, the content;
  download, from the advertisement decision server, the rules, wherein the rules indicate the campaign period; and
  download, from the advertisement content server, the plurality of advertisements, wherein the plurality of advertisements are selected by the advertisement content server based on the content and on the rules.

17. The apparatus of claim 14, wherein the rules indicate the campaign period and are received from the one or more second servers based on information associated with a user of the apparatus.

18. The apparatus of claim 14, wherein the instructions, when executed by the one or more processors, further configure the apparatus to determine, based on applying the rules to a local advertising decision service executing on the one or more processors and based on content stored on or output by the apparatus, that an advertisement of the plurality of advertisements is in the second portion.

19. The apparatus of claim 14, wherein the instructions, when executed by the one or more processors, further configure the apparatus to download the plurality of advertisements by:
  downloading the first portion, of the plurality of advertisements, in a first quantity of advertisements, wherein the first quantity is based on a total quantity of the one or more advertisement opportunities and on the campaign period; and
  downloading the second portion, of the plurality of advertisements, in a second quantity of advertisements, wherein the second quantity is based on the total quantity of the one or more advertisement opportunities and on an accessibility period of the content.

20. The apparatus of claim 14, wherein the campaign period comprises one or more of:
  a period of time;
  a quantity of outputs of the content; or
  a quantity of outputs of one or more advertisements from the first portion of the plurality of advertisements.

21. The apparatus of claim 14, wherein the instructions, when executed by the one or more processors, further configure the apparatus to:
  determine that output, during the caused output of the content with the selected downloaded advertisement inserted in the advertisement opportunity, of the selected downloaded advertisement satisfies a criteria; and
  store, based on the determining that the output of the selected downloaded advertisement satisfies the criteria, an indication of the output of the selected downloaded advertisement.

22. One or more non-transitory computer-readable media storing instructions that, when executed, configure a user device to:
  download:
    from a first server, content comprising one or more advertisement opportunities;
    from one or more second servers:
      rules for controlling insertion of advertising in the content; and
      a plurality of advertisements, based on the rules, for the one or more advertisement opportunities, wherein:
        a first portion of the plurality of advertisements is for a campaign period; and
        a second portion of the plurality of advertisements is for a subsequent period to the campaign period;
  receive a request to output the content;
  select, based on the request to output the content, based on the downloaded rules, and instead of contacting a remote server for an additional advertisement, a downloaded advertisement from the downloaded plurality of advertisements; and
  cause output, by the user device, of the content with the selected downloaded advertisement inserted in one of the one or more advertisement opportunities, wherein the selected downloaded advertisement is from the first portion if the outputting is during the campaign period or the selected downloaded advertisement is from the second portion if the outputting is during the subsequent period to the campaign period.

23. The one or more non-transitory computer-readable media of claim 22, wherein the instructions, when executed, configure the user device to cause the output by causing output, during the campaign period, of the content with a downloaded advertisement from the first portion, and
  wherein the instructions, when executed, further configure the user device to cause second output, after the campaign period, of the content with a downloaded advertisement from the second portion.

24. The one or more non-transitory computer-readable media of claim 22, wherein the first server comprises a content server and the one or more second servers comprise an advertisement content server and an advertisement decision server, and wherein the instructions, when executed, further configure the user device to send, to the content server, a request to download the content, and wherein the instructions, when executed, configure the user device to:
  download, from the content server and based on the sent request, the content;
  download, from the advertisement decision server, the rules, wherein the rules indicate the campaign period; and
  download, from the advertisement content server, the plurality of advertisements, wherein the plurality of advertisements are selected by the advertisement content server based on the content and on the rules.

25. The one or more non-transitory computer-readable media of claim 22, wherein the rules indicate the campaign period and are received from the one or more second servers based on information associated with a user of the user device.

26. The one or more non-transitory computer-readable media of claim 22, wherein the instructions, when executed, further configure the user device to determine, based on applying the rules to a local advertising decision service stored by the one or more non-transitory computer readable media and based on content stored on or output by a user device, that an advertisement of the plurality of advertisements is in the second portion.

27. The one or more non-transitory computer-readable media of claim 22, wherein the instructions, when executed, configure the user device to download the plurality of advertisements by:
  downloading the first portion, of the plurality of advertisements, in a first quantity of advertisements, wherein the first quantity is based on a total quantity of the one or more advertisement opportunities and on the campaign period; and
  downloading the second portion, of the plurality of advertisements, in a second quantity of advertisements, wherein the second quantity is based on the total quantity of the one or more advertisement opportunities and on an accessibility period of the content.

28. The one or more non-transitory computer-readable media of claim 22, wherein the campaign period comprises one or more of:
  a period of time;
  a quantity of outputs of the content; or
  a quantity of outputs of one or more advertisements from the first portion of the plurality of advertisements.

29. The one or more non-transitory computer-readable media of claim 22, wherein the instructions, when executed, further configure the user device to:
  determine that output, during the caused output of the content with the selected downloaded advertisement inserted in the advertisement opportunity, of the selected downloaded advertisement satisfies a criteria; and store, based on the determining that the output of the selected downloaded advertisement satisfies the criteria, an indication of the output of the selected downloaded advertisement.

30. A system comprising:
a first server;
one or more second servers;
a user device comprising;
   one or more first processors; and
   memory storing first instructions that, when executed by the one or more first processors, configure the user device to:
     download:
       from the first server, content comprising one or more advertisement opportunities;
       from the one or more second servers:
          rules for controlling insertion of advertising in the content; and
          a plurality of advertisements, based on the rules, for the one or more advertisement opportunities, wherein:
            a first portion of the plurality of advertisements is for a campaign period; and
            a second portion of the plurality of advertisements is for a subsequent period to the campaign period;
     receive a request to output the content;
     select, based on the request to output the content, based on the downloaded rules, and instead of contacting a remote server for an additional advertisement, a downloaded advertisement from the downloaded plurality of advertisements; and
     cause output of the content with the selected downloaded advertisement inserted in one of the one or more advertisement opportunities, wherein the selected downloaded advertisement is from the first portion if the outputting is during the campaign period or the selected downloaded advertisement is from the second portion if the outputting is during the subsequent period to the campaign period;
wherein the first server comprises:
   one or more second processors; and
   memory storing second instructions that, when executed by the one or more second processors, configure the first server to:
     send the content; and
wherein the one or more second servers comprise:
   one or more third processors; and
   memory storing third instructions that, when executed by the one or more third processors, configure the one or more second servers to:
     send the plurality of advertisements; and
     send the rules.

31. The system of claim 30, wherein the first instructions, when executed by the one or more first processors, configure the user device to:
cause the output of the content by causing output, during the campaign period, of the content with a downloaded advertisement from the first portion; and
cause second output, after the campaign period, of the content with a downloaded advertisement from the second portion.

32. The system of claim 30, wherein the first server comprises a content server and the one or more second servers comprise an advertisement content server and an advertisement decision server, and wherein the first instructions, when executed by the one or more first processors, further configure the user device to:
send, to the content server, a request to download the content;
download, from the content server and based on the sent request to download the content, the content;
download, from the advertisement decision server, the rules, wherein the rules indicate the campaign period; and
download, from the advertisement content server, the plurality of advertisements, wherein the plurality of advertisements are selected by the advertisement content server based on the content and on the rules.

33. The system of claim 30, wherein the rules indicate the campaign period and are received from the one or more second servers based on information associated with a user of the user device.

34. The system of claim 30, wherein the first instructions, when executed by the one or more first processors, further configure the user device to determine, based on applying the rules to a local advertising decision service executing on the one or more first processors and based on content stored on or output by the user device, that an advertisement of the plurality of advertisements is in the second portion.

35. The system of claim 30, wherein the first instructions, when executed by the one or more first processors, further configure the user device to download the plurality of advertisements by:
downloading the first portion, of the plurality of advertisements, in a first quantity of advertisements, wherein the first quantity is based on a total quantity of the one or more advertisement opportunities and on the campaign period; and
downloading the second portion, of the plurality of advertisements, in a second quantity of advertisements, wherein the second quantity is based on the total quantity of the one or more advertisement opportunities and on an accessibility period of the content.

36. The system of claim 30, wherein the campaign period comprises one or more of:
a period of time;
a quantity of outputs of the content; or
a quantity of outputs of one or more advertisements from the first portion of the plurality of advertisements.

37. The system of claim 30, wherein the first instructions, when executed by the one or more first processors, further configure the user device to:
determine that output, during the caused output of the content with the selected downloaded advertisement inserted in the advertisement opportunity, of the selected downloaded advertisement satisfies a criteria; and
store, based on the determining that the output of the selected downloaded advertisement satisfies the criteria, an indication of the output of the selected downloaded advertisement.

\* \* \* \* \*